US008867355B2

(12) United States Patent
Klein et al.

(10) Patent No.: US 8,867,355 B2
(45) Date of Patent: Oct. 21, 2014

(54) MOCA MULTICAST HANDLING

(75) Inventors: Philippe Klein, Jerusalem (IL); Avraham Kliger, Ramat Gan (IL); Yitshak Ohana, Givat Zeev (IL)

(73) Assignee: Broadcom Corporation, Irvine, CA (US)

( * ) Notice: Subject to any disclaimer, the term of this patent is extended or adjusted under 35 U.S.C. 154(b) by 534 days.

(21) Appl. No.: 12/835,959

(22) Filed: Jul. 14, 2010

(65) Prior Publication Data

US 2011/0013633 A1 Jan. 20, 2011

Related U.S. Application Data

(60) Provisional application No. 61/225,318, filed on Jul. 14, 2009, provisional application No. 61/229,174, filed on Jul. 28, 2009.

(51) Int. Cl.
| | | |
|---|---|---|
| G01R 31/08 | (2006.01) | |
| G06F 11/00 | (2006.01) | |
| G08C 15/00 | (2006.01) | |
| H04J 1/16 | (2006.01) | |
| H04J 3/14 | (2006.01) | |
| H04L 1/00 | (2006.01) | |
| H04L 12/26 | (2006.01) | |
| H04L 12/28 | (2006.01) | |
| H04J 3/26 | (2006.01) | |
| G06F 9/26 | (2006.01) | |
| G06F 9/34 | (2006.01) | |
| H04N 7/173 | (2011.01) | |
| H04L 12/701 | (2013.01) | |
| H04L 12/18 | (2006.01) | |

(52) U.S. Cl.
CPC ............ *H04L 12/2801* (2013.01); *H04L 45/00* (2013.01); *H04L 12/2861* (2013.01); *H04L 12/1886* (2013.01); *H04L 12/185* (2013.01)
USPC ...... 370/235; 370/390; 370/395.32; 370/432; 711/216; 725/97; 725/98; 725/118

(58) Field of Classification Search
USPC ............. 370/235, 390, 395.32, 432; 711/216; 725/118, 97, 98
See application file for complete search history.

(56) References Cited

U.S. PATENT DOCUMENTS

| | | |
|---|---|---|
| 3,836,888 A | 9/1974 | Boenke et al. |
| 4,413,229 A | 11/1983 | Grant |

(Continued)

FOREIGN PATENT DOCUMENTS

| | | |
|---|---|---|
| CN | 1422043 | 6/2003 |
| CN | 1588827 | 8/2004 |

(Continued)

OTHER PUBLICATIONS

International Search Report for International Application No. PCT/US03/27253 dated Dec. 30, 2003 (4 pgs).

(Continued)

*Primary Examiner* — Alpus H Hsu
*Assistant Examiner* — Yee Lam
(74) *Attorney, Agent, or Firm* — McDermott Will & Emery LLP

(57) ABSTRACT

An apparatus and methods for transmitting information over a home coax network are provided. A method according to the invention for transmitting information over a home coax network preferably includes adding a multicast transmission mode to a system that previously only had unicast transmission mode and broadcast mode. The method preferably includes broadcasting multicast ("MC") traffic. The MC traffic may be directed to a predetermined MC group. The MC traffic may be transmitted from an ingress node to a plurality of egress nodes. A portion of the plurality of egress nodes may belong to the MC group. Upon receipt by at least one of the egress nodes of the MC traffic, the method may further include using the at least one egress node to filter the received MC traffic to determine whether the MC traffic is directed to a group for which the egress node is a member.

23 Claims, 5 Drawing Sheets

(56) References Cited

U.S. PATENT DOCUMENTS

| | | |
|---|---|---|
| 4,536,875 A | 8/1985 | Kume et al. |
| 4,608,685 A | 8/1986 | Jain et al. |
| 4,893,326 A | 1/1990 | Duran et al. |
| 5,052,029 A | 9/1991 | James et al. |
| 5,170,415 A | 12/1992 | Yoshida et al. |
| 5,343,240 A | 8/1994 | Yu |
| 5,421,030 A | 5/1995 | Baran |
| 5,440,335 A | 8/1995 | Beveridge |
| 5,570,355 A | 10/1996 | Dail et al. |
| 5,638,374 A | 6/1997 | Heath |
| 5,671,220 A | 9/1997 | Tonomura |
| 5,796,739 A | 8/1998 | Kim et al. |
| 5,802,173 A | 9/1998 | Hamilton-Piercy et al. |
| 5,805,591 A | 9/1998 | Naboulsi et al. |
| 5,805,806 A | 9/1998 | McArthur |
| 5,815,662 A | 9/1998 | Ong |
| 5,822,677 A | 10/1998 | Peyrovian |
| 5,822,678 A | 10/1998 | Evanyk |
| 5,845,190 A | 12/1998 | Bushue et al. |
| 5,850,400 A | 12/1998 | Eames et al. |
| 5,854,887 A | 12/1998 | Kindell et al. |
| 5,856,975 A | 1/1999 | Rostoker et al. |
| 5,877,821 A | 3/1999 | Newlin et al. |
| 5,886,732 A | 3/1999 | Humpleman |
| 5,896,556 A | 4/1999 | Moreland et al. |
| 5,917,624 A | 6/1999 | Wagner |
| 5,930,493 A | 7/1999 | Ottesen et al. |
| 5,963,844 A | 10/1999 | Dail |
| 5,982,784 A | 11/1999 | Bell |
| 6,009,465 A | 12/1999 | Decker et al. |
| 6,028,860 A | 2/2000 | Laubach et al. |
| 6,055,242 A | 4/2000 | Doshi et al. |
| 6,069,588 A | 5/2000 | O'Neill, Jr. |
| 6,081,519 A | 6/2000 | Petler |
| 6,081,533 A | 6/2000 | Laubach et al. |
| 6,111,911 A | 8/2000 | Sanderford et al. |
| 6,118,762 A | 9/2000 | Nomura et al. |
| 6,157,645 A | 12/2000 | Shobatake |
| 6,167,120 A | 12/2000 | Kikinis |
| 6,192,070 B1 | 2/2001 | Poon et al. |
| 6,219,409 B1 | 4/2001 | Smith et al. |
| 6,229,818 B1 | 5/2001 | Bell |
| 6,243,413 B1 | 6/2001 | Beukema |
| 6,304,552 B1 | 10/2001 | Chapman et al. |
| 6,307,862 B1 | 10/2001 | Silverman |
| 6,434,151 B1 | 8/2002 | Caves et al. |
| 6,466,651 B1 | 10/2002 | Dailey |
| 6,481,013 B1 | 11/2002 | Dinwiddie et al. |
| 6,526,070 B1 | 2/2003 | Bernath |
| 6,553,568 B1 | 4/2003 | Fijolek et al. |
| 6,563,829 B1 | 5/2003 | Lyles et al. |
| 6,567,654 B1 | 5/2003 | Coronel Arredondo et al. |
| 6,611,537 B1 | 8/2003 | Edens et al. |
| 6,622,304 B1 | 9/2003 | Carhart |
| 6,637,030 B1 | 10/2003 | Klein |
| 6,650,624 B1 | 11/2003 | Quigley et al. |
| 6,745,392 B1 | 6/2004 | Basawapatna et al. |
| 6,763,032 B1 | 7/2004 | Rabenko et al. |
| 6,785,296 B1 | 8/2004 | Bell |
| 6,816,500 B1 | 11/2004 | Mannette et al. |
| 6,831,899 B1 | 12/2004 | Roy |
| 6,836,515 B1 | 12/2004 | Kay et al. |
| 6,859,899 B2 | 2/2005 | Shalvi et al. |
| 6,862,270 B1 | 3/2005 | Ho |
| 6,877,043 B2 | 4/2005 | Mallory et al. |
| 6,877,166 B1 | 4/2005 | Roeck et al. |
| 6,898,210 B1 | 5/2005 | Cheng et al. |
| 6,930,989 B1 | 8/2005 | Jones, IV et al. |
| 6,940,833 B2 | 9/2005 | Jonas et al. |
| 6,950,399 B1 | 9/2005 | Bushmitch et al. |
| 6,961,314 B1 | 11/2005 | Quigley et al. |
| 6,985,437 B1 | 1/2006 | Vogel |
| 6,996,198 B2 | 2/2006 | Cvetkovic |
| 7,035,270 B2 | 4/2006 | Moore et al. |
| 7,065,779 B1 | 6/2006 | Crocker et al. |
| 7,089,580 B1 | 8/2006 | Vogel et al. |
| 7,116,685 B2 | 10/2006 | Brown et al. |
| 7,127,734 B1 | 10/2006 | Amit |
| 7,133,697 B2 | 11/2006 | Judd et al. |
| 7,142,553 B1 | 11/2006 | Ojard et al. |
| 7,146,632 B2 | 12/2006 | Miller |
| 7,149,220 B2 | 12/2006 | Beukema et al. |
| 7,194,041 B2 | 3/2007 | Kadous |
| 7,292,527 B2 | 11/2007 | Zhou et al. |
| 7,296,083 B2 | 11/2007 | Barham et al. |
| 7,327,754 B2 | 2/2008 | Mills et al. |
| 7,372,853 B2 | 5/2008 | Sharma et al. |
| 7,460,543 B2 | 12/2008 | Malik et al. |
| 7,487,532 B2 | 2/2009 | Robertson et al. |
| 7,532,642 B1 | 5/2009 | Peacock |
| 7,532,693 B1 | 5/2009 | Narasimhan |
| 7,555,064 B2 | 6/2009 | Beadle |
| 7,574,615 B2 | 8/2009 | Weng et al. |
| 7,606,256 B2 | 10/2009 | Vitebsky et al. |
| 7,652,527 B2 | 1/2010 | Ido et al. |
| 7,653,164 B2 | 1/2010 | Lin et al. |
| 7,675,970 B2 | 3/2010 | Nemiroff et al. |
| 7,916,756 B2 | 3/2011 | Atsumi et al. |
| 8,184,550 B2 | 5/2012 | Beck et al. |
| 2001/0039660 A1 | 11/2001 | Vasilevsky |
| 2002/0010562 A1 | 1/2002 | Schleiss et al. |
| 2002/0021465 A1 | 2/2002 | Moore et al. |
| 2002/0059623 A1 | 5/2002 | Rodriguez et al. |
| 2002/0059634 A1 | 5/2002 | Terry et al. |
| 2002/0069417 A1 | 6/2002 | Kliger |
| 2002/0078247 A1 | 6/2002 | Lu et al. |
| 2002/0078249 A1 | 6/2002 | Lu et al. |
| 2002/0097821 A1 | 7/2002 | Hebron et al. |
| 2002/0105970 A1 | 8/2002 | Shvodian |
| 2002/0136231 A1 | 9/2002 | Leatherbury |
| 2002/0141347 A1 | 10/2002 | Harp et al. |
| 2002/0150155 A1 | 10/2002 | Florentin et al. |
| 2002/0166124 A1 | 11/2002 | Gurantz et al. |
| 2002/0174423 A1 | 11/2002 | Fifield et al. |
| 2002/0194605 A1 | 12/2002 | Cohen et al. |
| 2003/0013453 A1 | 1/2003 | Lavaud et al. |
| 2003/0016751 A1 | 1/2003 | Vetro et al. |
| 2003/0022683 A1* | 1/2003 | Beckmann et al. ............ 455/518 |
| 2003/0060207 A1 | 3/2003 | Sugaya et al. |
| 2003/0063563 A1 | 4/2003 | Kowalski |
| 2003/0066082 A1 | 4/2003 | Kliger |
| 2003/0099253 A1 | 5/2003 | Kim |
| 2003/0152059 A1 | 8/2003 | Odman |
| 2003/0169769 A1 | 9/2003 | Ho et al. |
| 2003/0193619 A1 | 10/2003 | Farrand |
| 2003/0198244 A1 | 10/2003 | Ho et al. |
| 2004/0004934 A1 | 1/2004 | Zhu et al. |
| 2004/0037366 A1 | 2/2004 | Crawford |
| 2004/0047284 A1 | 3/2004 | Eidson |
| 2004/0107445 A1 | 6/2004 | Amit |
| 2004/0163120 A1 | 8/2004 | Rabenko et al. |
| 2004/0172658 A1 | 9/2004 | Rakib et al. |
| 2004/0177381 A1 | 9/2004 | Kliger |
| 2004/0224715 A1 | 11/2004 | Rosenlof et al. |
| 2004/0258062 A1 | 12/2004 | Narvaez |
| 2005/0015703 A1 | 1/2005 | Terry et al. |
| 2005/0097196 A1 | 5/2005 | Wronski et al. |
| 2005/0152350 A1 | 7/2005 | Sung et al. |
| 2005/0152359 A1 | 7/2005 | Giesberts et al. |
| 2005/0175027 A1 | 8/2005 | Miller et al. |
| 2005/0204066 A9 | 9/2005 | Cohen et al. |
| 2005/0213405 A1 | 9/2005 | Stopler |
| 2006/0059400 A1 | 3/2006 | Clark et al. |
| 2006/0062250 A1 | 3/2006 | Payne, III |
| 2006/0068708 A1 | 3/2006 | Dessert et al. |
| 2006/0078001 A1 | 4/2006 | Chandra et al. |
| 2006/0104201 A1 | 5/2006 | Sundberg et al. |
| 2006/0256799 A1 | 11/2006 | Eng |
| 2006/0256818 A1 | 11/2006 | Shvodian et al. |
| 2006/0264218 A1* | 11/2006 | Zhang et al. ................. 455/450 |
| 2006/0268934 A1 | 11/2006 | Shimizu et al. |
| 2006/0280194 A1 | 12/2006 | Jang et al. |
| 2007/0025317 A1 | 2/2007 | Bolinth et al. |
| 2007/0040947 A1 | 2/2007 | Koga |

(56) References Cited

U.S. PATENT DOCUMENTS

| | | | |
|---|---|---|---|
| 2007/0071015 A1* | 3/2007 | Wang et al. | 370/401 |
| 2007/0104192 A1* | 5/2007 | Yoon et al. | 370/389 |
| 2007/0127373 A1 | 6/2007 | Ho et al. | |
| 2007/0160213 A1 | 7/2007 | Un et al. | |
| 2007/0171919 A1 | 7/2007 | Godman et al. | |
| 2007/0183786 A1 | 8/2007 | Hinosugi et al. | |
| 2007/0195771 A1* | 8/2007 | Lu | 370/390 |
| 2007/0206551 A1 | 9/2007 | Moorti et al. | |
| 2007/0217436 A1* | 9/2007 | Markley et al. | 370/401 |
| 2007/0253379 A1 | 11/2007 | Kumar et al. | |
| 2007/0286121 A1 | 12/2007 | Kolakowski et al. | |
| 2008/0037487 A1* | 2/2008 | Li et al. | 370/338 |
| 2008/0037589 A1 | 2/2008 | Kliger | |
| 2008/0080369 A1 | 4/2008 | Sumioka et al. | |
| 2008/0089268 A1 | 4/2008 | Kinder et al. | |
| 2008/0117919 A1 | 5/2008 | Kliger | |
| 2008/0117929 A1 | 5/2008 | Kliger | |
| 2008/0130779 A1 | 6/2008 | Levi | |
| 2008/0178229 A1 | 7/2008 | Kliger | |
| 2008/0189431 A1 | 8/2008 | Hyslop et al. | |
| 2008/0209004 A1* | 8/2008 | Hare et al. | 709/217 |
| 2008/0212591 A1 | 9/2008 | Wu et al. | |
| 2008/0225832 A1 | 9/2008 | Kaplan et al. | |
| 2008/0238016 A1 | 10/2008 | Chen et al. | |
| 2008/0259957 A1 | 10/2008 | Kliger | |
| 2008/0271094 A1 | 10/2008 | Kliger | |
| 2008/0273591 A1 | 11/2008 | Brooks et al. | |
| 2008/0279219 A1* | 11/2008 | Wu et al. | 370/474 |
| 2008/0298241 A1 | 12/2008 | Ohana | |
| 2009/0010263 A1 | 1/2009 | Ma et al. | |
| 2009/0052362 A1* | 2/2009 | Meier et al. | 370/311 |
| 2009/0063878 A1 | 3/2009 | Schmidt et al. | |
| 2009/0092154 A1 | 4/2009 | Malik et al. | |
| 2009/0106801 A1 | 4/2009 | Horii | |
| 2009/0122901 A1 | 5/2009 | Choi et al. | |
| 2009/0165070 A1 | 6/2009 | McMullin | |
| 2009/0217325 A1 | 8/2009 | Kliger | |
| 2009/0252172 A1 | 10/2009 | Hare | |
| 2009/0254794 A1 | 10/2009 | Malik et al. | |
| 2009/0257483 A1 | 10/2009 | French et al. | |
| 2009/0279643 A1 | 11/2009 | Shusterman | |
| 2009/0285212 A1* | 11/2009 | Chu et al. | 370/390 |
| 2009/0296578 A1* | 12/2009 | Bernard et al. | 370/231 |
| 2009/0307305 A1* | 12/2009 | Chu | 709/203 |
| 2009/0316589 A1 | 12/2009 | Shafeeu | |
| 2009/0323684 A1* | 12/2009 | Chu et al. | 370/389 |
| 2010/0031297 A1 | 2/2010 | Klein | |
| 2010/0080312 A1 | 4/2010 | Moffatt et al. | |
| 2010/0150016 A1 | 6/2010 | Barr | |
| 2010/0158013 A1 | 6/2010 | Kliger | |
| 2010/0158015 A1 | 6/2010 | Wu | |
| 2010/0158021 A1 | 6/2010 | Kliger | |
| 2010/0158022 A1 | 6/2010 | Kliger | |
| 2010/0162329 A1 | 6/2010 | Ford et al. | |
| 2010/0174824 A1 | 7/2010 | Aloni et al. | |
| 2010/0185731 A1 | 7/2010 | Wu | |
| 2010/0185759 A1 | 7/2010 | Wu | |
| 2010/0214916 A1* | 8/2010 | Wu et al. | 370/230 |
| 2010/0238932 A1 | 9/2010 | Kliger | |
| 2010/0246586 A1 | 9/2010 | Ohana | |
| 2010/0254278 A1 | 10/2010 | Kliger | |
| 2010/0254402 A1 | 10/2010 | Kliger | |
| 2010/0281195 A1 | 11/2010 | Daniel et al. | |
| 2010/0284474 A1 | 11/2010 | Kliger | |
| 2010/0290461 A1 | 11/2010 | Kliger | |
| 2010/0322134 A1* | 12/2010 | Wu | 370/312 |
| 2011/0001833 A1* | 1/2011 | Grinkemeyer et al. | 348/192 |
| 2011/0080850 A1 | 4/2011 | Klein et al. | |
| 2011/0205891 A1 | 8/2011 | Kliger et al. | |
| 2011/0206042 A1 | 8/2011 | Tarrab et al. | |
| 2011/0310907 A1 | 12/2011 | Klein et al. | |
| 2012/0093244 A1 | 4/2012 | Levi et al. | |

FOREIGN PATENT DOCUMENTS

| | | |
|---|---|---|
| EP | 0 385695 | 9/1990 |
| EP | 0 622926 | 11/1994 |
| EP | 1501326 | 1/2005 |
| JP | 60160231 | 8/1985 |
| WO | WO 98/27748 | 6/1998 |
| WO | WO 98/31133 | 7/1998 |
| WO | WO 99/35753 | 7/1999 |
| WO | WO 99/46734 | 9/1999 |
| WO | WO 00/31725 | 6/2000 |
| WO | WO 00/55843 | 9/2000 |
| WO | WO 01/80030 | 10/2001 |
| WO | WO 02/19623 | 3/2002 |

OTHER PUBLICATIONS

International Search Report for International Application No. PCT/US03/27254 dated Feb. 3, 2004 (5 pgs).

"Home Networking on Coax for Video and Multimedia, Overview for IEEE 802.1AVB", Shlomo Ovadia, San Ramon/California, May 30, 2007.

"Microtune Introduces Industry's First 1-GHZ Cable Tuners Compatible with MoCA—Home Networking Standard", Business Wire, San Francisco, California, Mar. 19, 2007.

Ovadia S., "MoCA: Ubiquitous Multimedia Networking in the Home," Proceedings of the SPIE—The International Society for Optical Engineering SPIE—The Internaitonal Society for Optical Engineering USA, [Online] 2007, XP002584642 ISSN: 0277-786X, Retrieved on Jul. 28, 2010 from the Internet: URL: http://spiedl.aip.org/getpdf/servlet/getPDFServlet?filetype=pdf&id=PSISDG006776000000167760C00000&idtype=cvips&prog=normal>.

Multichannel News, MoCA Brewing Up Bigger Bandwidth, Dec. 15, 2008 Interview with CTO Anton Monk, http://www.multichannel.com/article/160878-MoCa_Brewing_Up_bigger_Bandwidth.php downloaded on Mar. 29, 2009.

* cited by examiner

MOCA MULTICAST HANDLING

CROSS REFERENCE TO RELATED APPLICATION

This application is a non-provisional application of U.S. Provisional Patent Application No. 61/225,318, filed on Jul. 14, 2009, and U.S. Provisional Patent Application No. 61/229,174 filed on Jul. 28, 2009, which are hereby incorporated by reference herein in their respective entireties.

FIELD OF TECHNOLOGY

The present invention relates generally to information networks and specifically to transmitting information such as media information over communication lines such as coaxial cable (hereinafter "coax"), thereby to form a communications network.

BACKGROUND

Home networking over coax is a known technology which has vast commercial potential.

Home network technologies having a packet aggregation functionality are known generally. The Multimedia over Coax Alliance (MoCA™), at its website mocalliance.org, provides an example of a suitable specification (MoCA 1.0) for networking of digital video and entertainment through existing coaxial cable in the home which has been distributed to an open membership. Packet aggregation functionality is not provided. MoCA 1.0 specification is incorporated by reference herein in its entirety.

Home networking over coax taps into the vast amount of unused bandwidth available on in-home coax. More than 70% of homes in the United States have coax already installed in the home infrastructure. Many have existing coax in one or more primary entertainment consumption locations such as family rooms, media rooms and master bedrooms—ideal for deploying networks. Home networking technology allows homeowners as well as service providers to utilize this infrastructure as a networking system and to deliver other entertainment and information programming with high QoS (Quality of Service).

The technology underlying home networking over coax provides high speed, high QoS, and the innate security of a shielded, wired connection combined with state of the art packet-level encryption. Coax is designed for carrying high bandwidth video. Today, it is regularly used to securely deliver millions of dollars of pay per view and premium video content on a daily basis. Home networking over coax can also be used as a backbone for multiple wireless access points used to extend the reach of wireless network throughout a consumer's entire home.

Home networking over coax provides a consistent, high throughput, high quality connection through the existing coaxial cables to the places where the video devices currently reside in the home without affecting the existing analog or digital services present on the cable. Home networking over coax provides a primary link for digital entertainment, and may also act in concert with other wired and wireless networks to extend the entertainment experience throughout the home.

Currently, home networking over coax works with access technologies such as ADSL and VDSL services or Fiber to the Home (FTTH), that typically enter the home on a twisted pair or on an optical fiber, operating in a frequency band from a few hundred kilohertz to 8.5 MHz for ADSL and 12 MHz for VDSL. As services reach the home via xDSL or FTTH, they may be routed via home networking over coax technology and the in-home coax to the video devices. Cable functionalities, such as video, voice and Internet access, may be provided to homes, via coaxial cable, by cable operators, and use coaxial cables running within the homes to reach individual cable service consuming devices locating in various rooms within the home. Typically, home networking over coax type functionalities run in parallel with the cable functionalities, on different frequencies.

The coax infrastructure inside the house typically includes coaxial wires and splitters. Splitters used in homes typically have one input and two or more outputs and are designed to transfer signals from input to outputs in the forward direction, or from outputs to input in the backward direction and to isolate splitter outputs and prevent signals from flowing room/outlet to room/outlet. Isolation is useful in order to a) reduce interference from other devices and b) maximize power transfer from Point Of Entry (POE) to outlets for best TV reception.

The MoCA technology is specifically designed to go backwards through splitters (insertion) and go from splitter output to output (isolation). All outlets in a house can be reached from each other by a single "isolation jump" and a number of "insertion jumps". Typically isolation jumps have an attenuation of 5 to 40 dB and each insertion jump attenuates approximately 3 dB. MoCA has a dynamic range in excess of 55 dB while supporting 200 Mbps throughput. Therefore MoCA can work effectively through a significant number of splitters.

MoCA is a managed network that is unlike some other home networking technologies. It is specifically designed to support streaming video without packet loss, thus providing very high video quality between outlets.

Digital cable programming is delivered with very low Packet Error Rate (PER)—e.g., of below 1e-6. The home network should preferably have similar or better performance so as not to degrade viewing.

The disclosures of any publications and patent documents mentioned in the specification, and of the publications and patent documents cited therein directly or indirectly, are hereby incorporated by reference.

One issue with legacy MoCA 1.x mapping of Ethernet frames for network distribution as corresponding MoCA frames is that Ethernet frames include three different transmission types while MAC MoCA frames, which operate on a shared medium—i.e., wherein communication is either one-to-many or a one-to-all—include only two types of frames. It would be desirable to map legacy Ethernet frames in a one-to-one mapping scheme onto MAC MoCA frames.

SUMMARY OF THE INVENTION

A system and/or method for transmitting information over a home communications network, substantially as shown in and/or described in connection with at least one of the figures, as set forth more completely in the claims.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
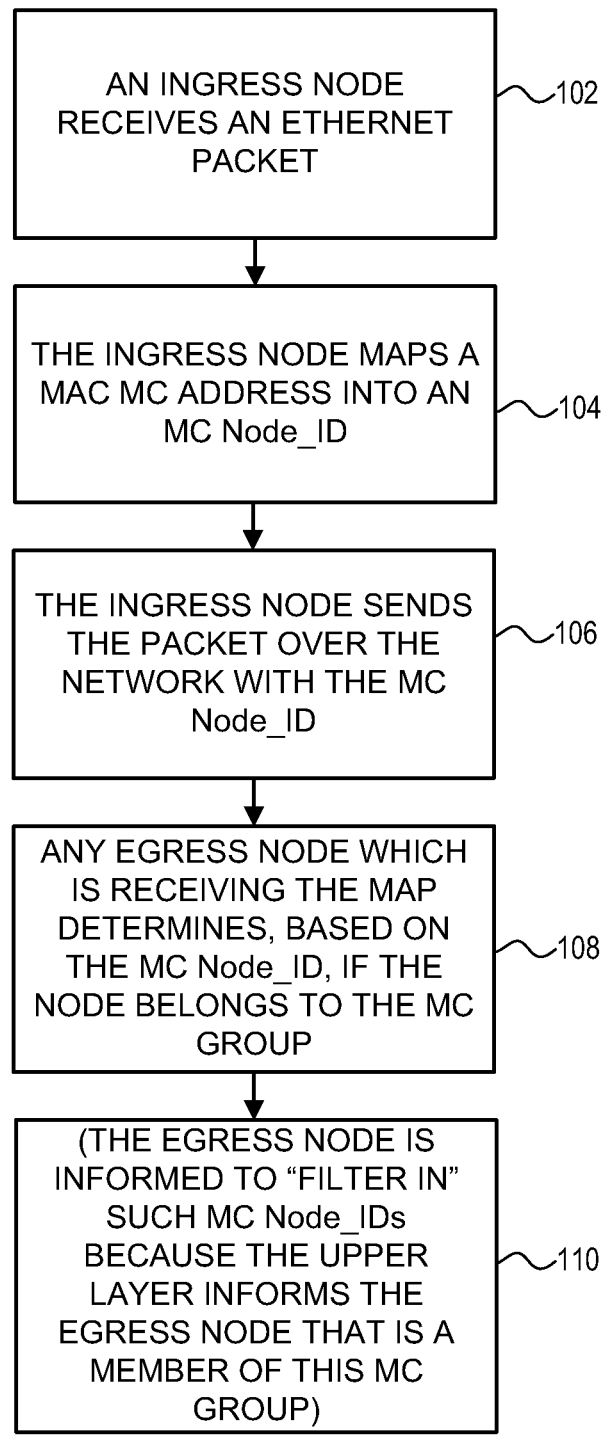
FIG. 1 shows an illustrative flow diagram in accordance with the principles of the invention.

The table below lists all possible transmission cases regarding suitable Ethernet frames, and their corresponding MoCA frames. The Ethernet frames are typically received from by a MoCA node from its respective Ethernet Convergence Layer ("ECL") for use with apparatus and methods according to the present invention. For the purposes of this application, the node that receives the Ethernet frame is identified as the ingress node. It should be noted that such frames may be Ethernet frames as defined by IEEE 802.3 standard or as defined by some other suitable standard.

TABLE 1

| Ethernet Frames Addressing Type | Corresponding MAC MoCA Frame |
| --- | --- |
| MAC unicast | MoCA unicast (transmitted in MoCA unicast profile) |
| MAC broadcast | MoCA broadcast (transmitted in MoCA broadcast profile) |
| MAC multicast | MoCA multicast (transmitted in MoCA broadcast frame) |

It should be noted that, with the respect to the above-identified Ethernet Frames Addressing Type, The Ethernet Frame Addressing Type specifies the frame type—i.e., an Ethernet frame with a unicast, multicast or broadcast destination address specifies, respectively, a unicast, multicast or broadcast frame. A MoCA node ID is the MoCA equivalent to an Ethernet MAC destination address. As with Ethernet addressing, a MoCA frame with a unicast, multicast or broadcast node ID is, respectively, a unicast, multicast or broadcast frame.

For the purposes of this application, a profile is a parametric definition for transmission on the MoCA PHY layer. For example, a MoCA unicast frame is transmitted with both the transmitter and single recipient configured with a set of parameters—known as a profile—which is specific to a point to point link. MoCA broadcast and multicast frames are transmitted with the transmitter and all the receivers participating in the transmission. Consequently, the transmitter and all the recipients are configured with the point to multipoint profile.

As stated above, one issue with mapping Ethernet frames for network distribution as corresponding MoCA frames is that Ethernet frames include three different addressing types (unicast, broadcast and multicast) while MAC MoCA frames, which operate on a shared medium include only two types (unicast and broadcast).

Specifically, Ethernet addressing includes unicast (the sending of messages to a single network destination host on a network), broadcast (the sending of messages to all possible destinations on a network) and multicast (the sending of messages only to interested destinations by using special addressing assignments) transmissions, while MoCA addressing include unicast and broadcast. Accordingly, in legacy MoCA network, Media Access Control ("MAC") multicast ("MC") frames typically have to be transmitted as broadcast frames, thereby consuming more computing resources on the receiving nodes than necessary.

Apparatus and methods for transmitting information over a home coax network are provided. These apparatus and methods may distinguish between Ethernet MAC MC frames and MAC broadcast frames broadcasted on MoCA. These apparatus and methods are based on a need to maintain certain nodes in a power-saving mode during MC traffic (for the purposes of this application, the term traffic is substantially synonymous with a plurality of transmitted frames).

These apparatus and methods are also based on a need to efficiently transmit MC messages in MoCA. Specifically, such apparatus and methods may further optimize MC handling on a MAC by configuring an egress node—i.e., a node that receives traffic from an ingress node—to filter out MAC MC frames for MC groups to which the node is not registered.

When a node is in power saving (alternatively referred to herein as "standby" mode or "sleep") mode, it may still be configured to receive MAC unicast and MAC broadcast frames in order to maintain network connectivity for higher layer protocols, but the node may not receive MC traffic—i.e., the traffic typically in the form of MC frames—because a node in power saving mode will preferably not be part of any MC group. Accordingly, these apparatus and methods are based, at least in part, on a need to keep nodes asleep during MC traffic.

Another aspect of the invention relates to preventing sleeping nodes from affecting the network performance. For example, a sleeping node may, under certain circumstances, lower the operational aspect of the broadcast profile in order to match the highest common profile of any of the nodes. Such an aspect of the invention may improve network performance by increasing, in certain circumstances, the network performance by raising the operational profile of the network.

For the purposes of this application, and as defined generally above, the profile should be understood as the way to program the transmitter module at the ingress node and/or the receiving module at the egress node(s) so that a packet will be transmitted and/or received appropriately over the medium's physical link.

Accordingly, apparatus and methods may preferably discriminate between Ethernet MAC MC frames and Ethernet MAC broadcast frames that are broadcasted on MoCA.

As stated above, certain embodiments of the invention may also be used for power management. Such power management may include maintaining a node in a power saving mode during certain MC traffic. It should be noted that, with respect to power-saving implementations of the invention, the characteristic of a MoCA link is affected by each node turning ON its receiver. Such receivers may be turned ON at different times. Whenever all the nodes turn their respective receivers ON to receive a frame transmitted in a broadcast mode, the network has a given characteristic.

In certain embodiments of the invention, when some nodes are in power-saving mode and only a subset of full power nodes (referred to herein in the alternative as "active mode") are configured to receive an MC frame transmitted in broadcast mode, preferably not all the nodes will turn their receiver ON to receive the frame transmitted in broadcast mode. Accordingly, the line has a characteristic different from that in broadcast mode described above where all the nodes are turning their receiver ON regardless of the node's power mode.

It should be noted that, according to one aspect of the invention, an "MC profile" according to the invention may preferably be implemented as a "broadcast profile for the subset of active nodes," or for another suitable MC group, while the legacy broadcast profile is a profile for all (active and sleeping) nodes. At stated above, this is because MoCA is a shared medium.

Accordingly, in addition to the per transmitter legacy broadcast profile which is determined for the circumstance where all the nodes, with the exception of the transmitter node, turn ON their respective receivers to receive the broadcast MoCA frame, the invention preferably may implement an MC profile for each transmitter which is calculated for all the active nodes, with the exception of the transmitter node, thus, enabling their receivers to receive the broadcast MoCA frame.

A sleeping node preferably will not participate at all in MC traffic. Therefore, a sleeping node does not have to turn its receiver ON in response to a predetermined MC transmission profile.

An active node may preferably turn ON its receiver whenever an Ethernet MAC MC frame is transmitted in broadcast mode over MoCA (to maintain the characteristic of the MoCA medium in accordance with the MC profile), but preferably will not receive—i.e., store and process—the MC frames from MC groups not registered to the node. In some embodiments of the invention, the information required to discriminate between MC groups that the node is registered to and MC groups that the node is not registered to is preferably received from a MoCA device management entity and implemented at the MoCA level. Such discrimination is preferably performed while parsing the MC MAP frame.

Nodes may preferably incorporate one of three possible types of node IDs (one for unicast, one for MC and one for broadcast) in the place of the legacy two types of node IDs (unicast and broadcast). Specifically, a given MC node ID according to the invention may preferably be used to map to a given MC group.

An embodiment of the invention may preferably optimize MC performance on MoCA by discovering if one of multiple egress nodes is registered to a given MC group. In the case that a single egress node only is registered to a given MC group, the MC frame may be transmitted to this single node as a unicast transmission. Such an embodiment may be more efficient than transmitting as a broadcast transmission.

In certain embodiments of the invention, filtering methods according to the invention may allow an egress node to filter out MC MoCA traffic assigned to a group for which the egress node is not registered. These filtering methods are described in more detail below.

FIG. 1 shows an illustrative flow diagram of a filtering method which supports MAC MC address mapping according to the invention. An ingress node receives an Ethernet frame from its ECL, 102. An ingress node may map a MAC MC address into a MC Node_ID, 104. The packet is sent over the network with the MC Node_ID, 106. Any egress node which is receiving the MAP will determine if the node belongs to the MC group based on the MC Node_ID, 108. The egress node preferably receives the addresses to which the node is subscribed from an application server at the time the egress node begins receiving data. Specifically, the egress node is informed to "filter in" such MC Node_IDs because the upper layer informs the egress node that the node is a member of the MC group that corresponds to the given MC Node_ID, 110.

More details of a first embodiment of filtering according to the invention follow. First, Node_IDs in the following range may be used for MC transmission; Node_ID range 0x10 . . . 0xFF except 0x3F. It should be noted that the invention can use any Node_ID that has not been allocated to unicast (0x00 . . . 0x09) or broadcast (0x3F)—i.e., outside the range of unicast, and not the single Node_ID allocated to broadcast.

Then, the filtering may derive directly, at both the ingress node and the egress node, the MoCA Multicast_NID from the MAC MC address as follows:

MC_Node_ID=(Hash[1] (MAC_MC) Modulo[2] (0xFF-0x10))+0x10;

[1] Use a non-linear function which allows processing of a set of data and obtain some hash result based on the input data. In this first embodiment, different sets of input data (48-bit MAC MC data) may produce the same output data (8-bit Node_ID). This occurrence is known as a collision. Such collisions may preferably be corrected at the ECL layer.
[2] Modulo—eliminate a number of bits to conform to the Node_ID convention.

if (MC_Node_ID==0x3F) decrement (or add) MC_Node_ID by 1;

It should be noted that the hash function may either be CRC-8 such as CRC-8/CCITT (a cyclic redundancy check used to detect accidental changes to raw computer data, and commonly known and used in digital networks) (available at http://www.itu.int/rec/T-REC-I.432.1-199902-I/en) or /ATM or any suitable non-linear polynomial.

The MoCA MC egress node may receive a MAC MC address from the Host IGMP (a communications protocol used to manage the membership of multicast groups—IGMP is used by hosts and adjacent multicast routers to establish multicast group memberships). The MoCA MC egress node may use the MAC MC address to generate the corresponding MC_Node_ID. The egress node may preferably store this information in a database.

In this embodiment of the invention, the MoCA MC ingress node may also generate corresponding MC_Node_IDs for each multicast frame and use the MC_Node_ID as the destination Node_ID in Reservation Request Request Elements ("RR's REs").

In certain embodiments of the invention, such a filtering method may preferably include no allocation of any MC_Node_IDs by the NC. Such a filtering method may also preferably optimize memory usage, not require maintenance of a database at each node and may not require handling of one entry per MC in the ECL classifier.

Furthermore, such MC filtering as described above may be corrected as necessary at the ECL layer and does not affect nodes that are not members of any MC group. In addition, such filtering may preferably not affect other power saving efforts at all.

An additional embodiment of filtering according to the invention may be implemented as follows: a MoCA MC may be uniquely identified by [SOURCE_NODE_ID, MC_NODE_ID] in the MAP's data allocation units ("DAUs"). The MC ingress node may assign unique MC_NODE_IDs for each MC MAC address. The MC egress node may broadcast notification frames to the other nodes in order to inform the other nodes to which MC groups the egress nodes belong.

The filtering may further use the Node_ID range 0x10 . . . 0xFF except 0x3F as Multicast Node_ID. Each of the MC ingress nodes can maintain a forwarding MC table that includes information broadcast by the egress node in MC_Notification messages. If the ingress node determines from the forwarding MC table that only one egress node is registered to a certain MC group, then the ingress node may transmit the frame as a unicast transmission instead of a broadcast transmission to reach the single egress node.

The MoCA MC egress nodes may receive MC MAC addresses from the Host IGMP. The MC egress nodes can maintain an egress MC table including MC MAC Addresses and the corresponding SOURCE_NODE_ID and MC_NODE_ID. Such a filtering embodiment may provide preferably no-fault filtering, and not involve the NC in allocating and maintaining MC_CHAN_IDs (MC_CHAN_IDs are described below in more detail). It should be noted that such an embodiment may require the implementation of notification messages and the maintenance of a database at each node.

Figure 2:
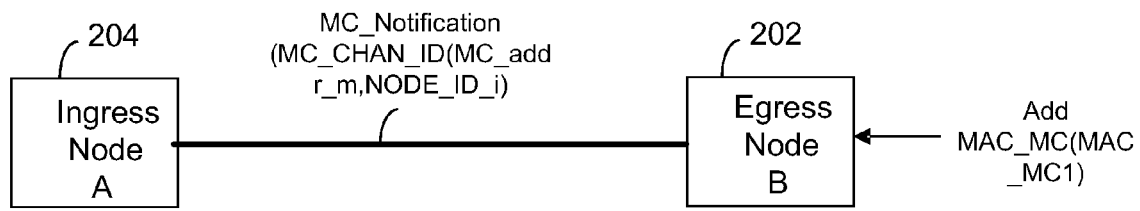
FIG. 2 shows another illustrative flow diagram in accordance with another embodiment of a method in accordance with the principles of the invention.
Figure 3:
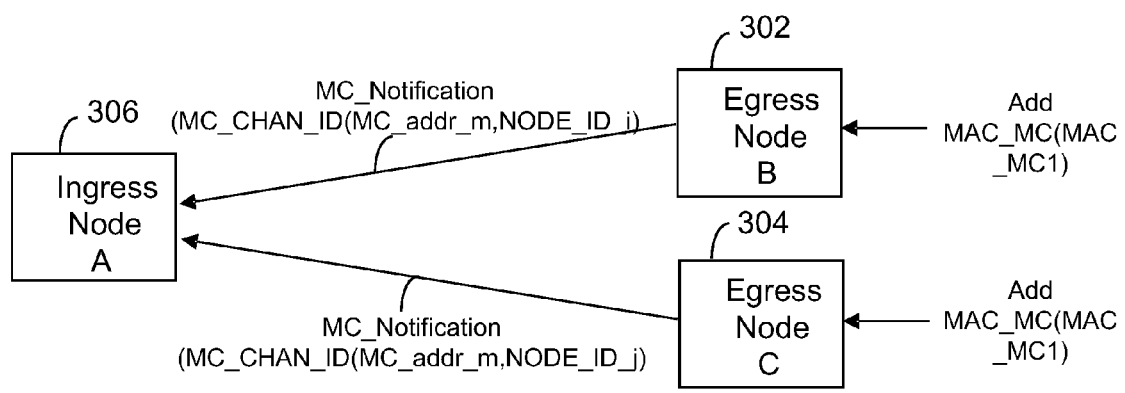
FIG. 3 shows another illustrative flow diagram in accordance with the embodiment of the method of FIG. 2 in accordance with the principles of the invention.
Figure 4:
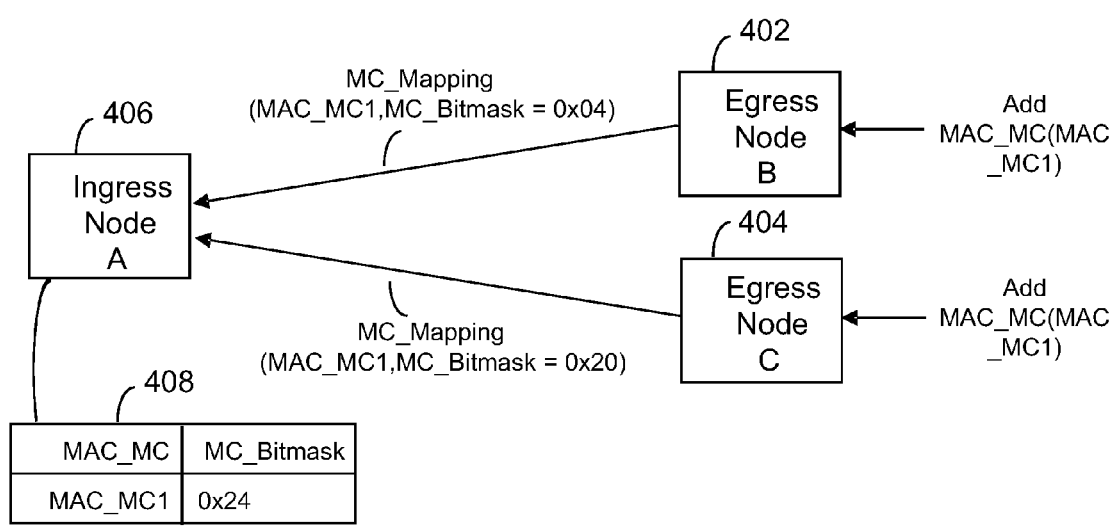
FIG. 4 shows yet another illustrative flow diagram in accordance with the embodiment of the method of FIG. 2 in accordance with the principles of the invention.

FIGS. 2-4 relate to the broadcast of MC notification messages from an egress node to an ingress node.

FIG. 2 shows egress node 202 and ingress node 204. Preferably, egress node 202 broadcasts an MC notification message when a new MC group is registered to the node. The MC notification message may be configured to map an MC_CHAN_ID to the NODE_ID. Such a method preferably optimizes MC traffic by allowing ingress nodes to unicast MAC MC frames mapped to a single NODE_ID rather than transmitting them in a broadcast transmission.

FIG. 3 shows egress nodes 302, 304 and ingress node 306. In FIG. 3, both egress nodes are broadcasting—i.e., transmitting—an MC notification message to each of the other nodes. This broadcasting may preferably occur when a new MC group membership is added to the node.

FIG. 4 shows yet another aspect of MoCA multicast handling according to the invention.

In a portion of a method according to the invention, egress nodes 402, 404 may broadcast—i.e., transmit to additional node(s)—the addition/removal of a new MAC_MC address to its own node in a mapping message. Such a message may include the following information: (MAC_MC, MC_Bitmap [NID]) where ("NID") is the multicast node identification information that is being added to the MC mapping.

In certain embodiments of the invention, it should be noted that to add or remove a multicast address from an egress node may utilize the standard network device driver MC Application Programming Interfaces ("APIs") of the host operating system ("OS").

Further, in certain embodiments of the invention, ingress node 406 may build a MC bitmap vector 308 for each MAC_MC by "OR"ing the MC mapping messages receiving from one or more of the egress nodes.

Following the build of MC bitmap vector 408, ingress node 406 may preferably include 16_bit MC_Bitmap vector 408 in reservation request elements for multicast transmissions.

In some embodiments of the invention, a network controller node ("NC") (not shown as designated in FIG. 4), may copy 16_bit MC Bitmap vector 408 into the MAP DAU granting the multicast reservation request. More specifically, the systems and methods according to the invention may use the DESTINATION NODE_ID field in DAUs to indicate MC Channel ID (MC_CHAN_ID)—i.e., the ID of the MoCA Physical channel being used to transmit—with direct mapping from the MC MAC address.

In certain embodiments of the invention, the apparatus and methods may require no additional protocol. Specifically, MAC MC to MoCA MC mapping should preferably be direct mapping (as the mapping of layer 3 IP MC address to Layer 2 MAC MC addresses) in order to avoid adding MoCA multicast mapping protocol. Furthermore, the multicast ID may be allocated by the NC. In addition, the apparatus and methods may utilize an OS's standard network device driver MC Application Programming Interfaces ("APIs") (for adding or removing an MC address). Preferably, no lookup table is needed in the egress node for MAP parsing. Such embodiments may utilize 16_bit bitmask NID comparison.

In view of the foregoing, some embodiments of the invention may include one or more of the following features: a unique MC profile per transmitter according to the invention and/or preventing nodes in power saving state from affecting the MC traffic throughput.

To simplify the discussion of MoCA power saving, this application defines below in Table 2 three MoCA Core Power Saving states M0, M1 and M3 that correspond to the open Advanced Configuration & Power Interface ("ACPI") specifications [www.acpi.info], which is hereby incorporated by reference herein in its entirety.

TABLE 2

| MoCA Core Power Mode | Description |
| --- | --- |
| M0 - Running | MoCA Core is running. Full network capabilities. |
| M1 - Standby | A Node in Standby State M1 should preferably be adapted to receive broadcast and unicast data. MoCA Core filters ingress MoCA frames. |
| M3 - Down | MoCA core is powered down. No network connection. Full reboot is required to reenter the running state. |

The following is one possible usage rule that may be implemented in embodiments of the present invention. MC traffic may use the following MC profile except in the case where:
1) an M1 node transitions back to M0;
2) AND the broadcast bit loading margin value is different from 0;
3) AND the re-activated node joins an MC group before a whole link management operation ("LMO") sequence completes.

Link management protocol, in general, may be used to maintain control channel connectivity, verify the physical connectivity of the data links, correlate the link property information, suppress downstream alarms, and localize link failures for protection/restoration purposes in multiple kinds of networks.

Where all the three conditions above are met, the MC transmissions may temporarily switch from MC profile to broadcast profile until the LMO sequence completes.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 5:
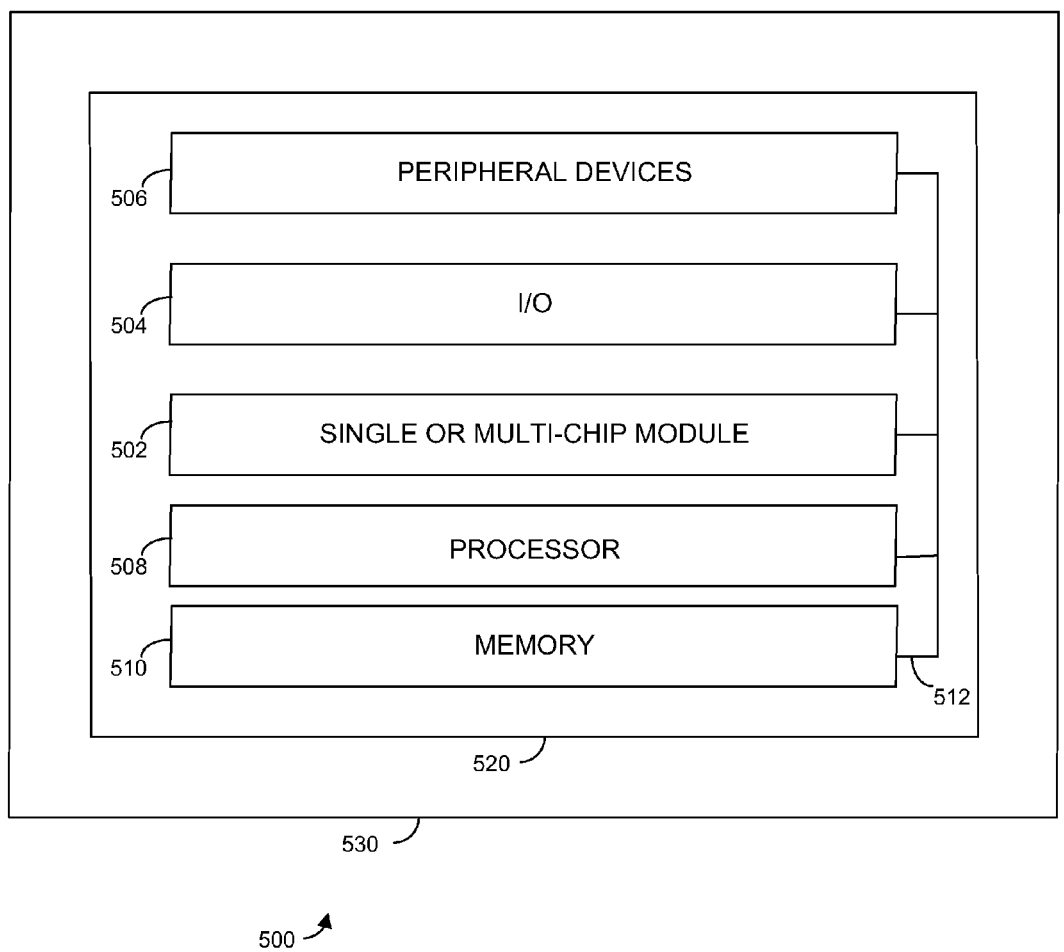
FIG. 5 shows a schematic diagram of an illustrative single or multi-chip device that may be used in accordance with principles of the invention.

FIG. 5 shows a single or multi-chip module 502 according to the invention, which can be one or more integrated circuits, in an illustrative data processing system 500 according to the invention. Data processing system 500 may include one or more of the following components: I/O circuitry 504, peripheral devices 506, processor 508 and memory 510. These components may be coupled together by a system bus or other interconnections 512 and are disposed on a circuit board 520 in an end-user system 530 that may be in communication with a coax medium via an interface.

For the sake of clarity, the foregoing description, including specific examples of parameter values provided, is sometimes specific to certain protocols such as those identified with the name MoCA™ and/or Ethernet protocols. However, this is not intended to be limiting and the invention may be suitably generalized to other protocols and/or other packet protocols. The use of terms that may be specific to a particular protocol such as that identified by the name MoCA™ or Ethernet to describe a particular feature or embodiment is not intended to limit the scope of that feature or embodiment to that protocol specifically; instead the terms are used generally and are each intended to include parallel and similar terms defined under other protocols.

It is appreciated that software components of the present invention including programs and data may, if desired, be implemented in ROM (read-only-memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques.

Features of the present invention which are described in the context of separate embodiments may be provided in combination in a single embodiment. Conversely, features of the invention which are described for brevity in the context of a single embodiment may be provided separately or in any suitable subcombination.

As will be appreciated by one of skill in the art, the invention described herein may be embodied in whole or in part as a method, a data processing system, chip, component or device, or a computer program product. Accordingly, the invention may take the form of an entirely hardware embodiment, an entirely software embodiment or an embodiment combining software, hardware and any other suitable approach or apparatus.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like. In a distributed computing environment, devices that perform the same or similar function may be viewed as being part of a "module" even if the devices are separate (whether local or remote) from each other.

The invention may be described in the general context of computer-executable instructions, such as program modules, being executed by a computer. Generally, program modules may include routines, programs, objects, components, data structures, etc., that perform particular tasks or store or process data structures, objects and other data types. The invention may also be practiced in distributed computing environments where tasks are performed by separate (local or remote) processing devices that are linked through a communications network. In a distributed computing environment, program modules may be located in both local and remote computer storage media including memory storage devices.

Thus, MOCA multicast handling over a home network has been provided. Persons skilled in the art will appreciate that the present invention can be practiced by other than the described embodiments, which are presented for purposes of illustration rather than of limitation.

What is claimed is:

1. A method for transmitting information over a home coax network, the method for adding a multicast transmission mode to a system that previously only had unicast transmission mode and broadcast transmission mode, the method comprising:
mapping, by an ingress node that is distinct from a network controller that coordinates transmissions over the home coax network, a multicast address associated with multicast traffic to a destination identifier associated with a multicast group, wherein the destination identifier is distinct from the multicast address;
transmitting the multicast traffic with the destination identifier, the multicast traffic being directed to the multicast group, by the ingress node to a plurality of egress nodes, wherein a first portion of the plurality of egress nodes are registered as members to the multicast group and a second portion of the plurality of egress nodes are not registered as the members to the multicast group;
upon receipt by an egress node of the plurality of egress nodes of the multicast traffic, determining, by the egress node, whether to process and store the multicast traffic based at least on whether the egress node is a member of the multicast group that is associated with the destination identifier of the multicast traffic; and
when the egress node transitions to a standby mode, the egress node is configured to receive a flow of broadcast traffic and a flow of unicast traffic, and to not receive a flow of multicast traffic.

2. The method of claim 1, further comprising transmitting, by the ingress node to the network controller, a reservation request for transmitting the multicast traffic over the network, wherein a first destination field of the reservation request comprises the destination identifier.

3. The method of claim 2, further comprising receiving, by the ingress node and the plurality of egress nodes from the network controller, a data allocation unit granting the reservation request, wherein a second destination field of the data allocation unit comprises the destination identifier.

4. The method of claim 3, wherein transmitting the multicast traffic with the destination identifier further comprises transmitting the multicast traffic with the destination identifier and exclusive of the multicast address.

5. A method for transmitting information over a network by a first node, the method comprising:
receiving a multicast data item that is associated with a multicast address that corresponds to a multicast group, wherein a first portion of a plurality of nodes of the network are members of the multicast group and a second portion of the plurality of nodes of the network are not members of the multicast group;
mapping, by the first node that is distinct from a network controller, the multicast address to a destination identifier;

transmitting, to the network controller that is distinct from the first node, a reservation request for transmitting the multicast data item over the network, wherein a first destination field of the reservation request comprises the destination identifier;

receiving, from the network controller, a media access plan (MAP) frame that comprises a data allocation unit granting the reservation request, wherein a second destination field of the data allocation unit comprises the destination identifier; and transmitting the multicast data item with the destination identifier over the network directed to the multicast group based at least on the data allocation unit.

6. The method of claim 5, wherein the multicast address is mapped to the destination identifier using a hash function and the network controller coordinates transmissions over the network.

7. The method of claim 6, wherein the reservation request and the data allocation unit exclude the multicast address, the multicast address being distinct from the destination identifier.

8. The method of claim 5, wherein the transmitting the multicast data item with the destination identifier over the network directed to the multicast group based at least on the data allocation unit further comprises:

transmitting the multicast data item with the destination identifier, and exclusive of the multicast address, over the network, based at least on the data allocation unit, to a plurality of second nodes that are associated with the multicast address, wherein the plurality of second nodes are distinct from the network controller.

9. The method of claim 8, further comprising:

transmitting a unicast frame over the network to a third node that is in a low power mode, wherein the third node is distinct from the first node, the plurality of second nodes and the network controller.

10. The method of claim 9, further comprising:

transmitting a broadcast frame over the network to the third node that is in the low power mode.

11. An ingress node, comprising:

a processor; and a memory including instructions that, when executed by the processor, cause the processor to:

receive a multicast data item that is associated with a multicast address that corresponds to a multicast group;

map the multicast address to a destination identifier, wherein the destination identifier is distinct from the multicast address;

transmit, to a network controller that is distinct from the ingress node, a reservation request for transmitting the multicast data item over a network, wherein a first destination field of the reservation request comprises the destination identifier and the reservation request excludes the multicast address;

receive, from the network controller, a media access plan (MAP) frame that comprises a data allocation unit granting the reservation request, wherein a second destination field of the data allocation unit comprises the destination identifier and the data allocation unit excludes the multicast address; and transmit the multicast data item with the destination identifier over the network directed to the multicast group based at least on the data allocation unit, wherein a first portion of a plurality of egress nodes of the network are members of the multicast group and a second portion of the plurality of egress nodes of the network are not members of the multicast group.

12. The ingress node of claim 11, wherein the instructions, when executed by the processor, cause the processor to:

map the multicast address to the destination identifier using a hash function.

13. The ingress node of claim 11, wherein the reservation request and the data allocation unit exclude the multicast address, the multicast address being distinct from the destination identifier.

14. A computer program product comprising instructions stored in a non-transitory computer-readable storage medium, the instructions comprising:

instructions for receiving a multicast data item that is associated with a multicast address that corresponds to a multicast group, wherein a first portion of a plurality of nodes of a network are members of the multicast group and a second portion of the plurality of nodes of the network are not members of the multicast group;

instructions for mapping the multicast address to a destination identifier;

instructions for transmitting a reservation request for transmitting the multicast data item over the network, wherein the reservation request comprises the destination identifier;

instructions for receiving a media access plan (MAP) frame that comprises a data allocation unit granting the reservation request, wherein the data allocation unit comprises the destination identifier; and instructions for transmitting the multicast data item with the destination identifier over the network directed to the multicast group based at least on the data allocation unit.

15. The computer program product of claim 14, wherein the instructions for mapping the multicast address to a destination identifier further comprise instructions for mapping the multicast address to a destination identifier using a hash function.

16. The computer program product of claim 14, wherein the reservation request and the data allocation unit exclude the multicast address, the multicast address being distinct from the destination identifier.

17. The computer program product of claim 14, wherein the instructions further comprise:

instructions for transmitting a unicast frame over the network to one of the plurality of nodes that is in a low power mode.

18. The computer program product of claim 17, wherein the instructions further comprise:

instructions for transmitting a broadcast frame over the network to the one of the plurality of nodes that is in the low power mode.

19. A system comprising:

an ingress node configured to:

map a multicast address associated with multicast traffic to a destination identifier associated with a multicast group, wherein the destination identifier is distinct from the multicast address;

transmit a reservation request for transmitting the multicast traffic over a network, wherein a first destination field of the reservation request comprises the destination identifier;

receive a data allocation unit granting the reservation request, wherein a second destination field of the data allocation unit comprises the destination identifier; and transmit the multicast traffic with the destination identifier directed to the multicast group over the network, wherein a first portion of a plurality of egress nodes of the network are members of the multicast group and a second portion of the plurality of egress nodes of the network are not members of the multicast group; and at least one of the plurality of egress nodes configured to:

receive the multicast traffic; and determine whether to process and store the multicast traffic based at least on whether the at least one of the plurality of egress nodes is a member of the multicast group associated with the destination identifier.

20. The system of claim 19, wherein the ingress node is configured to:

map the multicast address associated with the multicast traffic to the destination identifier using a hash function.

21. The system of claim 20, wherein the hash function comprises a cyclic redundancy check.

22. The system of claim 19, wherein the ingress node is configured to:

transmit the multicast traffic with the destination identifier and exclusive of the multicast address.

23. The system of claim 19, wherein the at least one of the plurality of egress nodes is configured to:

receive a flow of broadcast traffic and a flow of unicast traffic, and to not receive a flow of multicast traffic when the at least one of the plurality of egress nodes transitions to a standby mode.

* * * * *